United States Patent

Alterio et al.

[11] Patent Number: 5,904,862
[45] Date of Patent: *May 18, 1999

[54] METHODS FOR ETCHING BOROPHOSPHOSILICATE GLASS

[75] Inventors: Donna Lee Alterio, Mountain View; Dinh Lau Chu, Milpitas, both of Calif.

[73] Assignee: Lam Research Corporation, Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/673,172

[22] Filed: Jun. 26, 1996

[51] Int. Cl.$^6$ ...................................................... C03C 15/00
[52] U.S. Cl. ............................ 216/72; 438/743; 438/738; 438/740
[58] Field of Search ...................................... 438/706, 714, 438/715, 743, 738, 740; 216/72, 80

[56] References Cited

U.S. PATENT DOCUMENTS

| | | | |
|---|---|---|---|
| 5,556,501 | 9/1996 | Collins et al. | 156/345 |
| 5,589,413 | 12/1996 | Sung et al. | 438/261 |
| 5,611,888 | 3/1997 | Bosch et al. | 438/724 |
| 5,626,716 | 5/1997 | Bosch et al. | 438/723 |

*Primary Examiner*—Maria Nuzzolillo
*Assistant Examiner*—Laura Weiner
*Attorney, Agent, or Firm*—Beyer & Weaver, LLP.

[57] ABSTRACT

A method in a plasma processing chamber for etching through a selected portion of a borophosphosilicate glass (BPSG) layer of a wafer layer stack. The method includes the step of introducing an etchant source gas into the plasma processing chamber, which consists essentially of CO, $CHF_3$, and $C_4F_8$. The method further includes the step of striking a plasma in the plasma processing chamber from the etchant source gas. Additionally, there is included the step of etching at least partially through the BPSG layer with the plasma.

21 Claims, 2 Drawing Sheets

METHODS FOR ETCHING BOROPHOSPHOSILICATE GLASS

BACKGROUND OF THE INVENTION

The present invention relates to the fabrication of semiconductor integrated circuits. More particularly, the present invention relates to methods and apparatus for etching through a layer stack of an integrated circuit, including a borophosphosilicate glass (BPSG) layer, during integrated circuit fabrication.

In the fabrication of semiconductor integrated circuits, devices such as component transistors are typically formed on a semiconductor substrate, which may be made of silicon. During the fabrication process, various layers such as BPSG, polysilicon, metal, and the like, may be deposited on the wafer substrate and patterned with a photoresist process. Thereafter, portions of the layers, including the BPSG layer, may be etched away to form interconnect lines, trenches, and other features. The deposition and etching processes may be repeated until the desired circuit is obtained.

To facilitate discussion, FIG. 1 illustrates a cross section view of a pre-etch wafer 100. Wafer 100 is shown having a layer stack 102 disposed above the surface of a substrate 104. An oxide layer 106, typically comprising $SiO_2$, is shown disposed above silicon substrate 104. Above oxide layer 106, there may be disposed a polysilicon layer 108. A BPSG layer 110, which represents, e.g., a dielectric layer of the wafer stack, may be disposed above polysilicon layer 108.

It should be noted that there may be present other additional layers above, below, or in between the layers shown in layer stack 102. Further, not all of the shown layers need necessarily be present and some or all may be substituted by other different layers. The layers of layer stack 102 are readily recognizable to those skilled in the art and may be formed using any of a number of suitable and known deposition processes, including chemical vapor deposition (CVD), plasma-enhanced chemical vapor deposition (PECVD), and a physical vapor deposition (PVD), such as sputtering.

To form the various interconnect lines, trenches and other component regions that may be required in an integrated circuit, portions of certain layers of the layer stack, including, for example, the BPSG layer, may be etched using suitable etchant chemicals. Prior to etching, the wafer is typically prepared using a suitable photoresist technique. By way of example, one such photoresist technique may involve the patterning of the photoresist layer 112 by exposing the photoresist material in a contact or stepper lithography system, and the development of the photoresist material to form a mask to facilitate subsequent etching.

To illustrate, there is shown in FIG. 1 masked photoresist regions 112a and 112b, representing regions of photoresist layer 112 that have been left behind following the photoresist patterning step to protect the underlying regions. Areas 118 and 120 represent respectively an unetched contact region and an open field region through which portions of the underlying target layer(s), e.g., layer 110, are exposed for etching.

Once properly masked for etching, the wafer may then be etched using an appropriate etchant. During etching, the areas of the target layer(s) that are left exposed to the etchant, e.g., portions of layer 110 in areas 118 and 120, may be etched away. The areas underlying the protective photoresist mask regions are left behind, forming features which may extend through the etched layer(s).

To achieve greater circuit density, modern integrated circuits are scaled with increasingly narrower design rules. As a result, the feature sizes, for example the width of the contact areas, trenches, and lines, have steadily decreased. By way of example, while a line width of approximately 0.8 microns ($\mu$m) may be considered acceptable in a 4 megabit (Mb) dynamic random access memory (DRAM) integrated circuit, 256 Mb DRAM integrated circuits preferably employ interconnect lines as thin as 0.25 $\mu$m or even thinner.

As the feature sizes shrink, the process with which the etching step is performed becomes increasingly critical. By way of example, as the features become finer, it becomes increasingly difficult to achieve a uniform etch rate across the wafer. In some cases, the etch rate in the narrow spacings, e.g., area 118, may be slower than that in the wider regions, e.g., area 120. This phenomenon, referred herein as the loading in etch rates, may be a consequence of micro-loading and aspect ratio-dependent etching (ARDE). Micro-loading or RIE lag refers primarily to the situation wherein the etch rate is reduced in smaller contacts or trenches when compared to larger contacts or trenches in the same location on the wafer. It can also be said that the aspect ratio of large or small contacts or trenches are different and therefore the etch exhibits ARDE. The loading in etch rates causes trenches to be formed in the layer stack at different rates.

For illustration purposes, FIG. 2 shows a cross-sectional view of post-etch wafer 200, including wafer stack 102 after a conventional BPSG etching step is performed. Even though both areas 118 and 120 were exposed to the same etch chemistries and conditions, the depth of the etch in open field area 120 may extend much further into the underlying polysilicon layer 108 relative to the depth of the etch in the narrow spacing area 118. The difference in etching depths may be caused, in part, by the aforementioned etch rate loading phenomenon.

The loading in etch rates may become more severe when trench widths fall below about 0.5$\mu$, and especially when trench widths fall below about 0.35$\mu$. As a result of the etch rate variations, areas having a higher etch rate, such as open field region 120, may become susceptible to over-etching. As the term is used herein, over-etching is the inadvertent removal of materials from the layer(s) underlying the target layer, e.g., polysilicon layer 108 if BPSG layer 110 is the target layer for the etch. If the etch rate variations are sufficiently large, it may not be possible, for some geometry, to etch through the target layer, e.g., BPSG layer 110, in the narrower spacings without causing undue damage to the underlying layers in open field regions. Such damage may render the wafer undergoing processing unsuitable for use in integrated circuit fabrication. Consequently, the minimization of the etch rate loading may represent an important consideration in the design of a BPSG etch process, particularly in etch processes designed for submicron contact etching.

Another important consideration in the design of a BPSG etch process is the overall BPSG etch rate. In generally, the higher the BPSG etch rate, the greater the throughput, i.e., the higher the number of wafers processed per unit of time. Consequently, all things being equal, a higher BPSG etch rate is generally desirable.

The selectivity of BPSG to other layers during a BPSG etch step may represent another potentially important consideration in the design of a BPSG etch process. As the term is used herein, the selectivity of BPSG to another layer represents the ratio of the etch rate of the BPSG layer relative to the etch rate of the other layer during a BPSG etch. Since a polysilicon layer may be disposed under the BPSG layer in the fabrication of many important electronic devices, e.g., metal oxide semiconductor (MOS) transistors, a high BPSG to polysilicon selectivity is generally desired.

Another potentially important variable may be the profile angle that results from the etch. With reference to FIG. 2, the etch profile angle represents the angle made by the etch sidewall, e.g., the sidewall of BPSG feature 110a for a BPSG etch, to the wafer plane. In general, it is desirable to design an etch process to achieve as vertical an etch profile angle as possible. Still further, uniformity represents another potentially important process result. Uniformity, as the term is used herein, describes how uniform an etch process is across the entire wafer. If the uniformity is poor, some areas of the wafer may be etched severely while other areas may be inadequately etched, possibly rendering some of these areas unsuitable for circuit fabrication. As is apparent, an etch process that can provide a good level of etch uniformity across the wafer surface is highly desirable.

In the prior art, there exist many BPSG etch processes. However, these processes were typically optimized for a particular set of requirements, e.g., high BPSG to titanium silicide or titanium nitride or for different geometries. As technology changes, however, IC chip manufacturers continually search for ways to improve BPSG etch results. In view of the foregoing, what is desired are improved methods and apparatus for etching a BPSG layer in a wafer layer stack.

SUMMARY OF THE INVENTION

The invention relates, in one embodiment, to a method in a plasma processing chamber for etching through a selected portion of a borophosphosilicate glass (BPSG) layer of a wafer layer stack. The method includes the step of introducing an etchant source gas into the plasma processing chamber, which consists essentially of CO, $CHF_3$, and $C_4F_8$. The method further includes the step of striking a plasma in the plasma processing chamber from the etchant source gas. Additionally, there is included the step of etching at least partially through the BPSG layer with the plasma.

In another embodiment, the invention relates to a method for improving a selectivity of borophosphosilicate glass (BPSG) to polysilicon while etching a layer of the BPSG in a plasma processing chamber. The method includes the steps of introducing an etchant source gas into the plasma processing chamber, which consists essentially of CO, $CHF_3$, and $C_4F_8$, and striking a plasma in the plasma processing chamber from the etchant source gas. Further, there is included the step of etching at least a portion of the BPSG layer with the plasma through to a layer of the polysilicon.

In yet another embodiment, the invention relates to a method, in a plasma processing chamber, for etching through a wafer's layer stack comprising a borophosphosilicate glass (BPSG) layer disposed above a layer of polysilicon. The method includes the step of introducing an etchant source gas into the plasma processing chamber. The etchant source gas consists essentially of CO, $CHF_3$, and $C_4F_8$. The method further includes the step of striking a plasma in the plasma processing chamber from the etchant source gas. Additionally, there is also included the step of etching at least partially through portions of the BPSG layer with the plasma.

These and other advantages of the present invention will become apparent upon reading the following detailed descriptions and studying the various figures of the drawings.

DETAILED DESCRIPTION OF THE PREFERRED EMBODIMENTS

Figure 1:
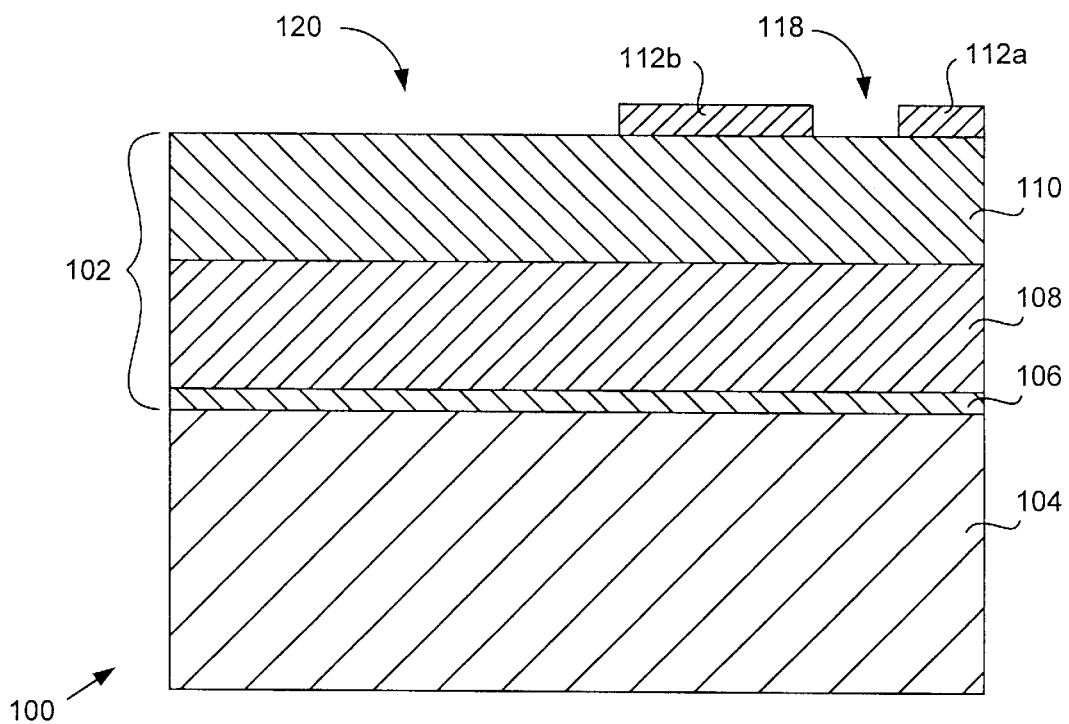
FIG. 1 illustrates a cross-section view of a pre-etch wafer, including a layer stack having a BPSG layer and a polysilicon layer.
Figure 2:
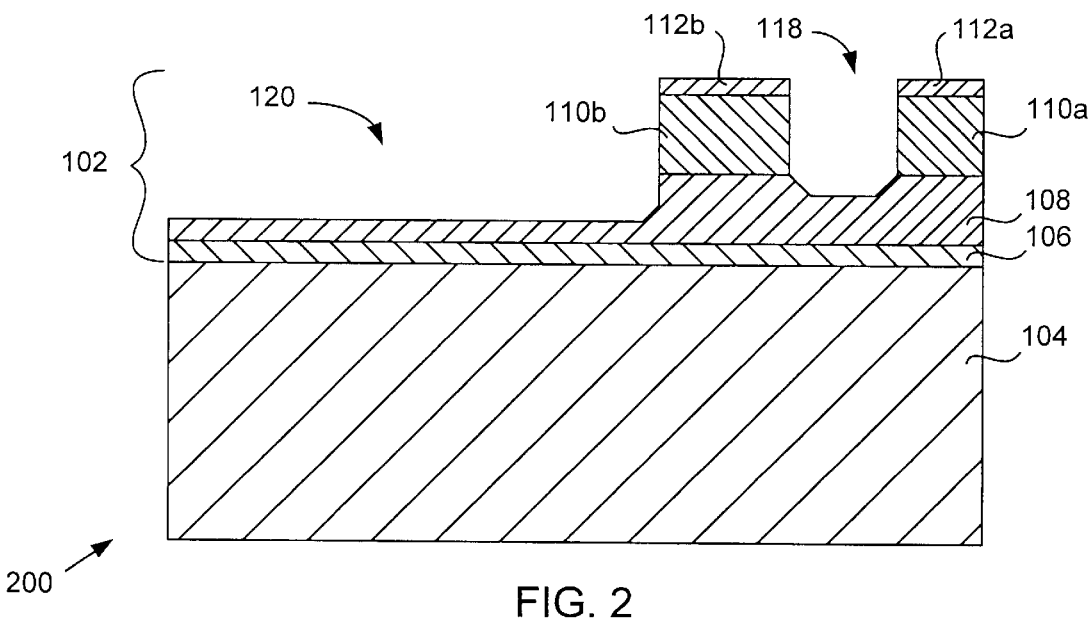
FIG. 2 illustrates a cross-section view of the layer stack of FIG. 1 after a portion of the BPSG layer has been etched away by a conventional etching process.

An invention is described for etching portions of a layer stack, including the BPSG layer, during the manufacture of integrated circuits. In the following description, numerous specific details are set forth in order to provide a thorough understanding of the present invention. It will be obvious, however, to one skilled in the art, that the present invention may be practiced without some or all of the specific details. In other instances, well-known process steps have not been described in detail in order not to unnecessarily obscure the present invention.

In accordance with one aspect of the present invention, there is provided a novel etching process for etching the BPSG layer of a wafer's layer stack. The novel etching process may be performed in any of the known plasma processing apparatuses, including those adapted for dry etching, plasma etching, reactive ion etching, magnetically enhanced reactive ion etching, or the like.

To further elaborate, in a typical plasma processing chamber adapted for dry etching, the wafer is treated with plasma. The plasma processing chamber typically includes a gas supply means from which gaseous materials are supplied to the plasma processing chamber's interior. A suitable RF energy source, such as an RF power supply, may be electrically coupled to supply RF energy to one or more electrodes associated with the plasma processing chamber to ionize the gaseous materials and to induce a plasma within the plasma processing chamber. The RF energy itself may be coupled inductively or capacitively to sustain the plasma, as is known. Species are then formed with the gaseous materials to react with, and etch away, the areas of the wafer's layer stack which are exposed to the plasma. The by-products, which may be volatile, are then exhausted through an exhaust port.

Plasma etching relates to the situation where the wafer is positioned on an anode, within the plasma processing chamber, or on a grounded electrode during wafer processing. On the other hand, reactive ion etching relates to the situation where the wafer is positioned on a cathode, or a powered electrode during wafer processing. Magnetically enhanced reactive ion etching represents a variant of the reactive ion etching process wherein a magnetic field is applied to the plasma processing chamber so as to reduce the loss of energetic electrons to the wall surfaces of the plasma processing chamber. It has been found that the magnetically enhanced reactive ion etching process, under certain conditions, can increase the efficiency of the energy transfer from the electrodes to the electrons in the plasma.

In one embodiment, the present invention employs a Oxide 9500™ plasma triode chamber reactor, which is available from Lam Research Corporation of Fremont, Calif. It is contemplated, however, that the invention may be practiced in any of the above processes, as well as in other suitable plasma processing chamber configurations and processes. Note that the above is true irrespective whether RF energy to the plasma is delivered through capacitively coupled parallel electrode plates, through electron cyclotron resonance(ECR) microwave plasma sources, or through inductively coupled RF sources such as helicon, helical resonators, and transformer coupled plasma (TCP). ECR and TCP processing systems, among others, are available from Lam Research Corporation.

Figure 3:
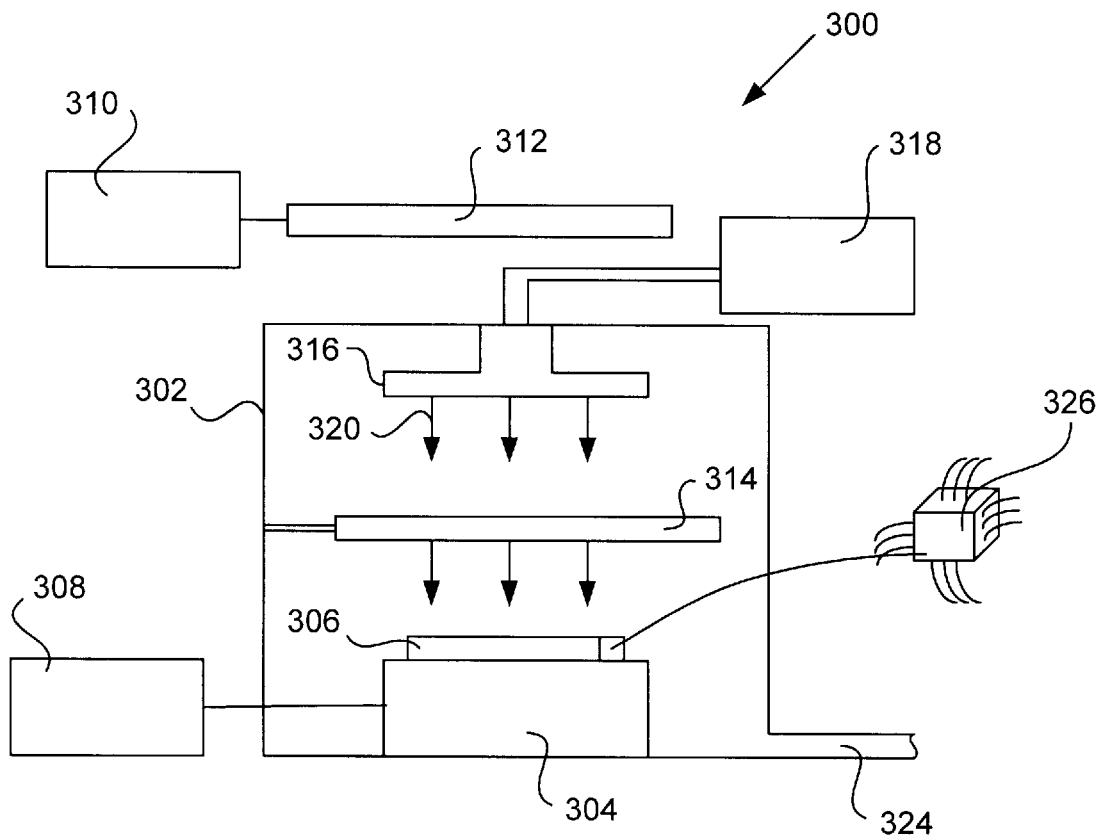
FIG. 3 illustrates a cross-section view of a plasma processing system suitable for etching a BPSG layer of a wafer stack in accordance with one aspect of the present invention.

FIG. 3 illustrates the simplified schematic of a plasma processing system 300, such as the Oxide 9500™ plasma reactor, which may be employed to etch wafers containing a BPSG layer in accordance with one aspect of the present invention. As shown in FIG. 3, plasma processing system 300 includes a plasma processing chamber 302. Within plasma processing chamber 302, there is disposed a chuck 304, which holds a wafer 306 during etching. There is coupled to chuck 304 a RF power supply 308, which supplies RF energy to chuck 304. When energized, chuck 304 acts as a powered bottom electrode during etching. Chuck 304 may be coupled at its underside to receive, under pressure at the chuck/wafer interface, helium or other inert cooling gas. The cooling gas acts as a heat transfer medium for accurately controlling the wafer's temperature during processing, thereby improving etch uniformity and repeatability. Although not required in one embodiment, FIG. 3 also shows a second RF power supply 310 for supplying RF energy to a top electrode 312.

Within the plasma processing chamber 302, there exists a center electrode 314, which is shown positioned between wafer 306 and a shower head 316. Center electrode 314 may, in one embodiment, represent a flat plate. In one embodiment, center thru-holes of 15 mm and edge thru-holes of 9 mm were provided in center electrode 314. Center electrode 314 may, in one embodiment, act as a grounded grid to enhance the ion density of the plasma within plasma processing chamber 302. Shower head 316 is located within plasma processing chamber 302 and serves to receive and distribute gaseous etch materials from a gas supply source 318. Alternatively, the gaseous etch materials may be supplied from ports built into the walls of chamber 302.

There are also shown an exhaust port 324 extending from the interior of plasma processing chamber 302, which may be connected to other devices and apparatuses, such as pumps, to remove gasses and other materials during processing. Exhaust port 324 may also function to maintain a desired pressure within plasma processing chamber 302. Via plasma processing system 300, wafer 306 may be processed and eventually cut into dies for packaging into IC chips (shown in FIG. 3 is integrated circuit chip 326).

In one embodiment, the pressure within plasma processing chamber 302 is kept low, for example, between about 15 mTorr to about 300 mTorr. A plurality of heaters (omitted from FIG. 3 to simplify the illustration), may also be provided to maintain a suitable chamber temperature for etching. To provide a path to ground, the chamber wall of plasma processing chamber 302 and center electrode 314 may be grounded with reference to RF power supply 308.

In accordance with one aspect of the present invention, there is provided an improved etch process for etching a wafer stack, including a BPSG layer overlaying a polysilicon layer, in a plasma processing chamber. The inventive etch process employs, in one embodiment, CO, $CHF_3$, and $C_4F_8$ as components of the etchant source gas. For illustration purposes, Table 1 below shows the approximate parameters suitable for etching a BPSG layer in accordance with inventive etch process. In Table 1, there are shown an approximate suitable range, an approximate preferred range, and an approximate preferred value for the flow rates of various components of the etchant source gas, the RF energy to be supplied to the electrodes of the plasma processing chamber, and the temperature of the lower electrode during etching.

It should be borne in mind that the parameters shown herein are scaled for etching a BPSG layer disposed on a 8 inch wafer in a Oxide 9500™ plasma reactor. The parameters shown herein may be scaled appropriately for etching a wafer having a different size, and/or in a different plasma processing reactor. The scaling of the supplied parameters for etching other wafers and/or in other plasma processing chambers should be readily apparent to those skilled in the art in light of this disclosure. Additionally, not all the parameters shown are required in every case. Also, other conventional parameter values that may be helpful for the etch and omitted herein for ease of illustration, e.g., the flow rate of the backside coolant gas, should be readily apparent to those skilled in the art.

TABLE 1

| Etching Chemistry | Range | Preferred Range | Preferred Value |
|---|---|---|---|
| CO Gas Flow Rate (sccm) | 5–100 | 10–50 | 35 |
| $CHF_3$ Gas Flow Rate (sccm) | 2–43 | 4–22 | 15 |
| $C_4F_8$ Gas Flow Rate (sccm) | 0–6 | 1–3 | 2 |
| Pressure (mTorr) | 15–300 | 100–200 | 150 |
| RF Power to Lower Electrode (Watts) | 700–1300 | 800–1200 | 1000 |
| Chuck Temp. (C. °) | (−10)–(+20) | 0–15 | 12 |

The inventive BPSG etch process utilizes an etching chemistry consisting essentially of CO gas, $CHF_3$ gas, and $C_4F_8$ gas. It is believed that the CO and $C_4F_8$ components act as catalysts, or possibly polymer-forming agents, and the $CHF_3$ component acts as the primary etching agent. In accordance with one aspect of the present invention, there is provided an etching process which balances the polymer deposition and BPSG removal in a manner so as to derive advantageous BPSG etch results, e.g., increased BPSG etch rates, increased BPSG:polysilicon selectivity, improved uniformity, and the like. Further, it is believed that the use of catalysts or polymer-forming agents, such as the aforementioned CO or $C_4F_8$, in the etching chemistry micromasks the wider spacings, i.e., causing masking polymers to be deposited in the wider spacings at a faster rate than in the narrower spacings. Due to the micromasking phenomenon, the etch rate in the wider spacings are slowed, thereby reducing the difference between the etch rate in the wider spacings, and that in the narrower spacings.

In one embodiment, the components of the etchant source gas are mixed with a $CO:C_4F_8$ flow ratio ranging from about 50:1 to about 3:1. More preferably, the $CO:C_4F_8$ flow ratio is about 17.5:1, in one embodiment. The $CO:CHF_3$ flow ratio ranging from about 13:1 to about 0.5:1. More preferably, the $CO:CHF_3$ flow ratio is about 2.3:1, in one embodiment. As mentioned earlier, the actual flow rate of each component, i.e., of the CO gas, $CHF_3$ gas, or $C_4F_8$ gas, is dependent upon several factors, including the actual plasma processing chamber size and wafer size.

To etch an 8-inch wafer in a Lam Research Corp.'s Oxide 9500™ plasma processing chamber, the flow rate of CO gas is, in one embodiment, between about 5 standard cubic centimeters per minute (sccm) and 100 sccm, more preferably, between about 10 sccm and 50 sccm, and most preferably, at about 35 sccm. The flow rate of $CHF_3$ gas is, in one embodiment, between about 2 sccm and 43 sccm, more preferably, between about 4 sccm and 22 sccm, and most preferably, at about 15 sccm. The flow rate of $C_4F_8$ gas is, in one embodiment, between about 0 sccm and 6 sccm, more preferably, between about 1 sccm and 3 sccm, and most preferably, about 2 sccm.

During the etch, the pressure within the plasma processing chamber is, in one embodiment, between about 15 mTorr and 300 mTorr, more preferably between about 100 mTorr and 200 mTorr, and most preferably, at about 150 mTorr. For the Oxide 9500™ plasma processing reactor, RF power (at about 13.56 MHz) applied to the lower electrode is, in one embodiment, between about 700 watts (W) and 1300 W, more preferably, between about 800 W and 1200 W, and most preferably, at about 1000 W (for an 8" wafer). As with some other parameters in Table 1, the RF power supplied may be a function of the wafer size and may be scaled appropriately for a wafer of a different size and/or for a different plasma processing system.

The temperature of the bottom electrode or chuck may be between about −10° C. and +20° C., more preferably, between about 0° C. and +15° C., and most preferably, at about +12° C. In one embodiment, these temperatures may be measured by, for example, a temperature probe at the surface of the chuck.

It has been found that the use of the inventive etch process provides commercially advantageous BPSG etch rates, for example above 8,000 Å per minute in one embodiment, while maintaining a high BPSG to polysilicon selectivity. The high BPSG:polysilicon selectivity achieved by the inventive process, e.g., above 100:1 in one embodiment, advantageously minimizes any inadvertent removal of the underlying polysilicon layer material during the BPSG etch step. This is in contrast with prior art BPSG etch processes, which typically etch BPSG at a rate of around 4,000 Å per minute and with lower BPSG:polysilicon selectivity.

In one example, the inventive etch process advantageously results in a uniformity value of less than 10% (uniformity is defined as three times the standard deviation of all points measured on the wafer. This is referred to herein as the 3-sigma value. Advantageously, it has been found that the profile angle is as high as 87 degrees or more in one embodiment. Further, it is possible to achieve an RIE lag value, i.e., the difference in the etch rates, of about 5% in one embodiment.

Figure 4:
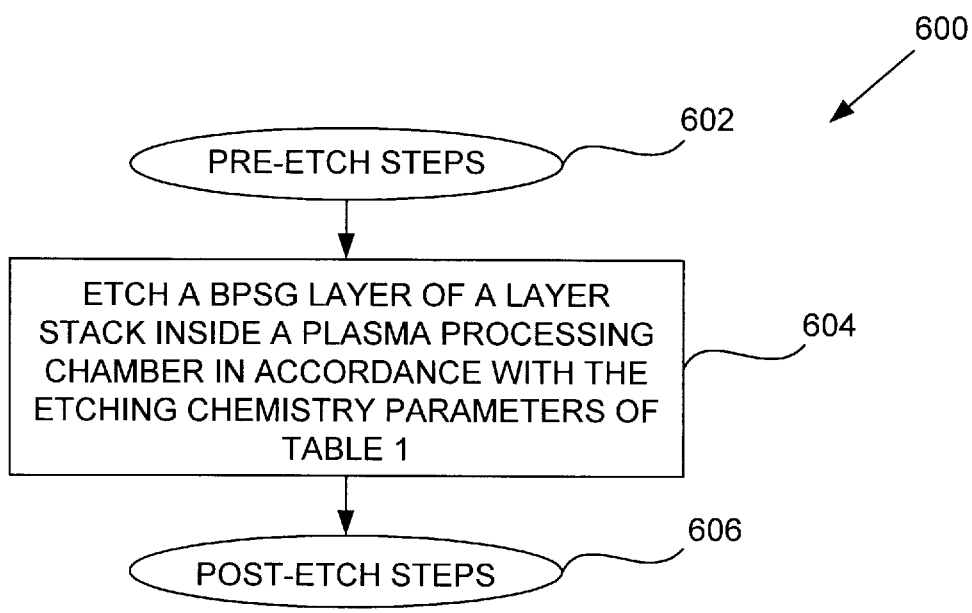
FIG. 4 shows, in accordance with one aspect of the present invention, the steps involved in the method for etching a BPSG layer.

FIG. 4 is a flow chart illustrating, in one embodiment of the present invention, a method for etching a BPSG layer of a semiconductor wafer. As depicted in FIG. 4, the method for etching a BPSG layer includes a pre-etch step 602, an etching step 604, and a post-etch step 606. Pre-etch step 602 represents, in one embodiment, the initial step in the etching process and may include preparing the wafer for etching, placing the wafer on a chuck, and clamping the wafer thereto, using a mechanical chuck or via electrostatic force. Additional steps may include, e.g., introducing the appropriate cooling gas to the backside of the wafer.

Etching step 604 includes the step of introducing the etchant source gas comprising CO, $CHF_3$, and $C_4F_8$ into the plasma processing chamber and striking a plasma therefrom to etch selected portions of the BPSG layer. In one embodiment, the etching step is performed in accordance with the parameters shown in Table 1. Etching may terminate after a predetermined period of time. Alternatively, etching may end at a predefined end point, such as upon detecting that portions of the BPSG layer that are designated for etching are substantially etched through.

Post-etch step 606 may include a cool-down step followed by a declamping and removal step wherein the wafer is removed from the plasma processing chamber. Additionally, post-etch step 606 may include using the wafer to create one or more integrated circuits by cutting the wafer into dies and processing the dies using conventional integrated circuit techniques.

EXAMPLES

In one example, an 8-inch wafer is etched in a Lam Research Corp.'s Oxide 9500™ plasma processing system. The etchant source gas includes about 35 sccm of CO gas, about 15 sccm of $CHF_3$ gas, and about 2 sccm of $C_4F_8$. The chamber pressure during the BPSG etch step is at about 150 mTorr, and about 1000W of RF power is supplied to the lower electrode. The gap setting between the mechanical chuck and the wafer is set at about 1.635 cm, and the temperature of the lower electrode (i.e., the chuck) is maintained at about 12° C., using approximately 12 Torr of helium cooling gas.

With this set-up, the BPSG layer was etched and the following results were achieved. Using a refractive light film thickness measurement tool, a BPSG etch rate of about 8778 Å per minute, a BPSG uniformity (3-sigma) of about 27%, a polysilicon etch rate of 86 Å per minute, and a BPSG-to-polysilicon selectivity ratio of about 102:1 were observed. Additional testing with 6-inch wafers produced, in some cases, a BPSG uniformity lower than 10%.

On the same wafer, using a scanning electron microscope (SEM), a BPSG etch rate of 7126 Å per minute was obtained. RIE lag values of 5.1% (at the center of the wafer) and 5.4% (at the wafer edge) were obtained using a small geometry of 0.55 microns and a large geometry of 1 micron. The selectivity of BPSG to polysilicon is greater than about 75:1 and the profile angle is about 88° or better.

Advantageously, the present invention may, in one embodiment, employ very little or no neon, thereby reducing costs. It is believed that the reduction or removal of the neon gas component from the etchant source gas may improve the RIE lag values in the BPSG etch step. It is also observed that the BPSG etch rate tends to increase with increasing $CHF_3$ gas flow and chamber pressure.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for etching through a selected portion of a borophosphosilicate glass (BPSG) layer in a layer stack on a wafer, comprising:

positioning said wafer into a plasma processing chamber;

introducing an etchant source gas into said plasma processing chamber, said etchant source gas consisting essentially of CO, $CHF_3$, and $C_4F_8$;

striking a plasma in said plasma processing chamber from said etchant source gas; and etching at least partially through said BPSG layer with said plasma.

2. The method of claim 1 wherein a flow rate of said $C_4F_8$ is between about 0 and about 6 standard cubic centimeters per minute (sccm).

3. The method of claim 2 wherein a flow rate of said CO is between about 5 and about 100 standard cubic centimeters per minute (sccm).

4. The method of claim 3 wherein a flow rate of said $CHF_3$ is between about 2 and about 43 standard cubic centimeters per minute (sccm).

5. The method of claim 4 wherein a chamber pressure within said plasma processing chamber is between about 15 mTorr and about 300 mTorr during said etching step.

6. The method of claim 1 wherein a flow rate of said $C_4F_8$ is between about 1 and about 3 standard cubic centimeters per minute (sccm), a flow rate of said CO is between about 4 to about 22 sccm, and a flow rate of said $CHF_3$ is between about 10 to about 50 sccm.

7. The method of claim 6 wherein a chamber pressure within said plasma processing chamber is between about 100 mTorr and about 200 mTorr during said etching step.

8. The method of claim 1 wherein a chamber pressure within said plasma processing chamber is about 150 mTorr.

9. The method of claim 8 wherein a flow rate of said $C_4F_8$ is about 2 standard cubic centimeters per minute (sccm), a flow rate of said CO is about 15 sccm, and a flow rate of said $CHF_3$ is about 35 sccm.

10. A method for improving the etch rate selectivity of borophosphosilicate glass (BPSG) to polysilicon while etching a layer of said BPSG in a layer stack on a wafer, said layer stack comprising said layer of BPSG above a layer of said polysilicon, comprising:

positioning said wafer into a plasma processing chamber;

introducing an etchant source gas into said plasma processing chamber, said etchant source gas consisting essentially of CO, $CHF_3$, and $C_4F_8$;

striking a plasma in said plasma processing chamber from said etchant source gas; and etching at least a portion of said BPSG layer with said plasma through to said layer of polysilicon.

11. The method of claim 10 wherein the ratio of a flow rate of said CO to a flow rate of said $C_4F_8$ is between about 3:1 to about 50:1.

12. The method of claim 11 wherein the ratio of a flow rate of said CO to a flow rate of said $CHF_3$ is between about 0.5:1 to about 13:1.

13. The method of claim 12 wherein a chamber pressure within said plasma processing chamber is between about 15 mTorr and about 300 mTorr during said etching step.

14. The method of claim 13 wherein a temperature of a chuck in said plasma processing chamber is between about 0° C. to about 15° C. during said etching step.

15. The method of claim 10 wherein the ratio of a flow rate of said CO to a flow rate of said $C_4F_8$ is about 17.5:1.

16. The method of claim 15 wherein the ratio of a flow rate of said CO to a flow rate of said $CHF_3$ is about 2.3:1.

17. The method of claim 16 wherein a chamber pressure within said plasma processing chamber is between about 15 mTorr and about 300 mTorr during said etching step.

18. The method of claim 17 wherein a temperature of a chuck in said plasma processing chamber is between about 0° C. to about 15° C. during said etching step.

19. A method for etching through a borophosphosilicate glass (BPSG) layer in a layer stack on a wafer, said layer stack comprising said borophosphosilicate glass (BPSG) layer disposed above a layer of polysilicon, comprising:

positioning said wafer into a plasma processing chamber;

introducing an etchant source gas into said plasma processing chamber, said etchant source gas consisting essentially of CO, $CHF_3$, and $C_4F_8$;

striking a plasma in said plasma processing chamber from said etchant source gas; and etching at least partially through portions of said BPSG layer with said plasma.

20. The method of claim 19 wherein a ratio of a flow rate of said CO to a flow rate of said $C_4F_8$ is about 17.5:1, a ratio of a flow rate of said CO to a flow rate of said $CHF_3$ is about 2.3:1, and a pressure in said plasma processing chamber is about 150 mTorr during said etching step.

21. The method of claim 20 wherein a temperature of a chuck underlying said wafer is about 12° C., and said chuck is provided with about 1000 watts of RF power.

* * * * *